(12) United States Patent
Costabel et al.

(10) Patent No.: US 8,939,473 B2
(45) Date of Patent: Jan. 27, 2015

(54) LOCKING MECHANISM FOR A HOUSING AND LOCK SUITABLE THEREFOR

(75) Inventors: Sascha Costabel, Otisheim (DE); Olav Schendel, Stuttgart (DE)

(73) Assignee: SFS Intec Holding AG, Heerbrugg (CH)

( * ) Notice: Subject to any disclaimer, the term of this patent is extended or adjusted under 35 U.S.C. 154(b) by 184 days.

(21) Appl. No.: 13/514,117

(22) PCT Filed: Dec. 8, 2010

(86) PCT No.: PCT/EP2010/069179
§ 371 (c)(1),
(2), (4) Date: Jun. 6, 2012

(87) PCT Pub. No.: WO2011/070072
PCT Pub. Date: Jun. 16, 2011

(65) Prior Publication Data
US 2012/0248790 A1 Oct. 4, 2012

(30) Foreign Application Priority Data

Dec. 9, 2009 (DE) .......................... 10 2009 044 832
Apr. 1, 2010 (DE) ...................... 20 2010 000 528 U

(51) Int. Cl.
| | | |
|---|---|---|
| *E05C 19/10* | (2006.01) | |
| *E05B 41/00* | (2006.01) | |
| *E05B 53/00* | (2006.01) | |

(Continued)

(52) U.S. Cl.
CPC ............... *E05B 63/143* (2013.01); *E05B 41/00* (2013.01); *E05B 53/003* (2013.01); *E05B 15/004* (2013.01); *B64D 11/003* (2013.01); *E05C 3/28* (2013.01)

USPC ................. 292/96; 292/45; 292/51; 292/117; 292/119; 292/199

(58) Field of Classification Search
USPC ........... 292/44, 45, 49, 51, 54, 116, 117, 119, 292/120, 128, 199, 213, 216, 218, 219, 220, 292/228, 279, 280, DIG. 23, 96
See application file for complete search history.

(56) References Cited

U.S. PATENT DOCUMENTS 4,896,520 A * 1/1990 Bruhnke et al. ................. 70/159
7,261,328 B2 * 8/2007 Minix .............................. 292/28

(Continued)

FOREIGN PATENT DOCUMENTS

| DE | 68902907 | 1/1993 |
| DE | 4312344 | 7/1994 |

(Continued)

*Primary Examiner* — Kristina Fulton
*Assistant Examiner* — Christine M Mills
(74) *Attorney, Agent, or Firm* — Volpe and Koening, P.C.

(57) ABSTRACT

A locking mechanism (100) and a lock (110) are provided. The locking mechanism (100) comprises a push-button (148) connected to a freewheel (154) via a traction cable, with the freewheel being connected to a drive device (160) of the lock (110). A baggage compartment in the cabin of an airplane usually comprises two locks (110) of this type which can be unlocked by the push-button (148). A freewheel (154) arranged between the push-button (148) and the lock (110) ensures that the push-button (148) remains in a pushed position as long as each lock (110) allocated to the baggage compartment is not in a correctly locked position. It can be identified from the position of the push-button of the baggage compartment whether both locks of the baggage compartment are correctly snapped in.

5 Claims, 9 Drawing Sheets

(51) Int. Cl.
*E05B 63/14* (2006.01)
*E05B 15/00* (2006.01)
*B64D 11/00* (2006.01)
*E05C 3/28* (2006.01)

(56) References Cited

U.S. PATENT DOCUMENTS

2002/0056296 A1* 5/2002 Weinerman et al. .............. 70/79

2009/0038352 A1* 2/2009 Yamaguchi et al. ............ 70/237

FOREIGN PATENT DOCUMENTS

| DE | 20017674 | 2/2001 |
|----|----------|--------|
| DE | 60000043 | 1/2003 |
| GB | 2437620 | 10/2007 |
| WO | 2008086256 | 7/2008 |
| WO | 2010004030 | 1/2010 |

* cited by examiner

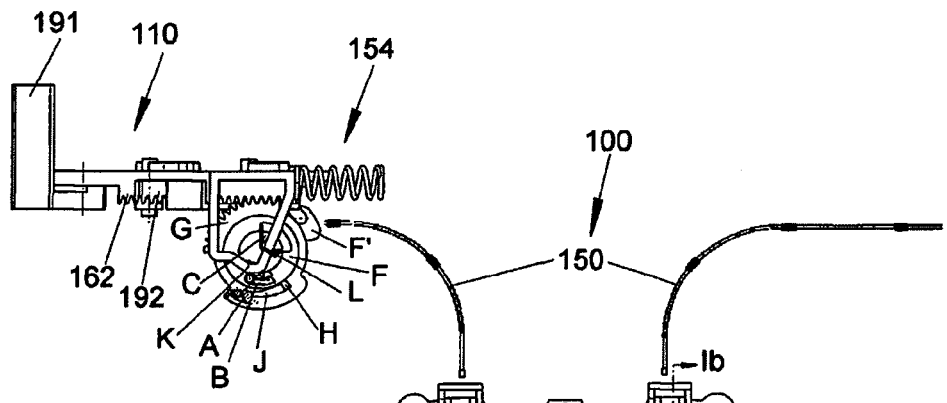
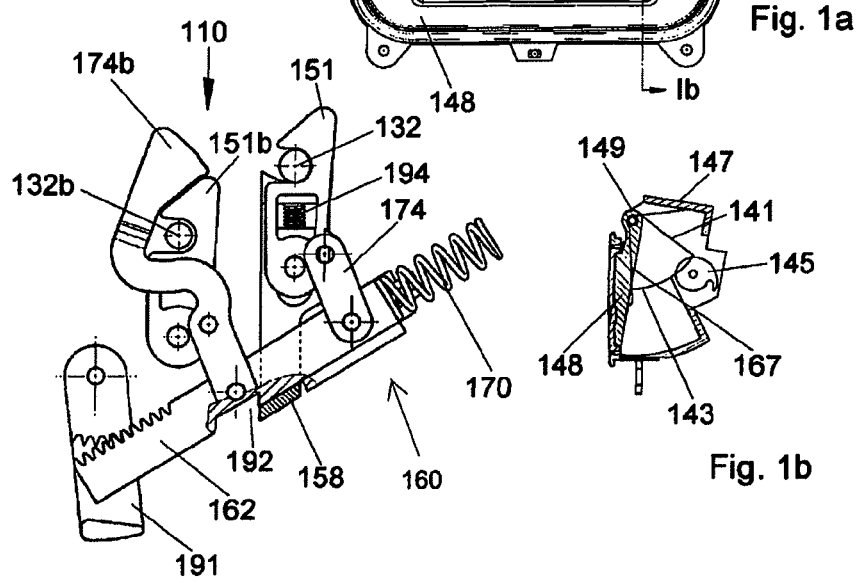
Fig. 1a
Fig. 1b
Fig. 1c

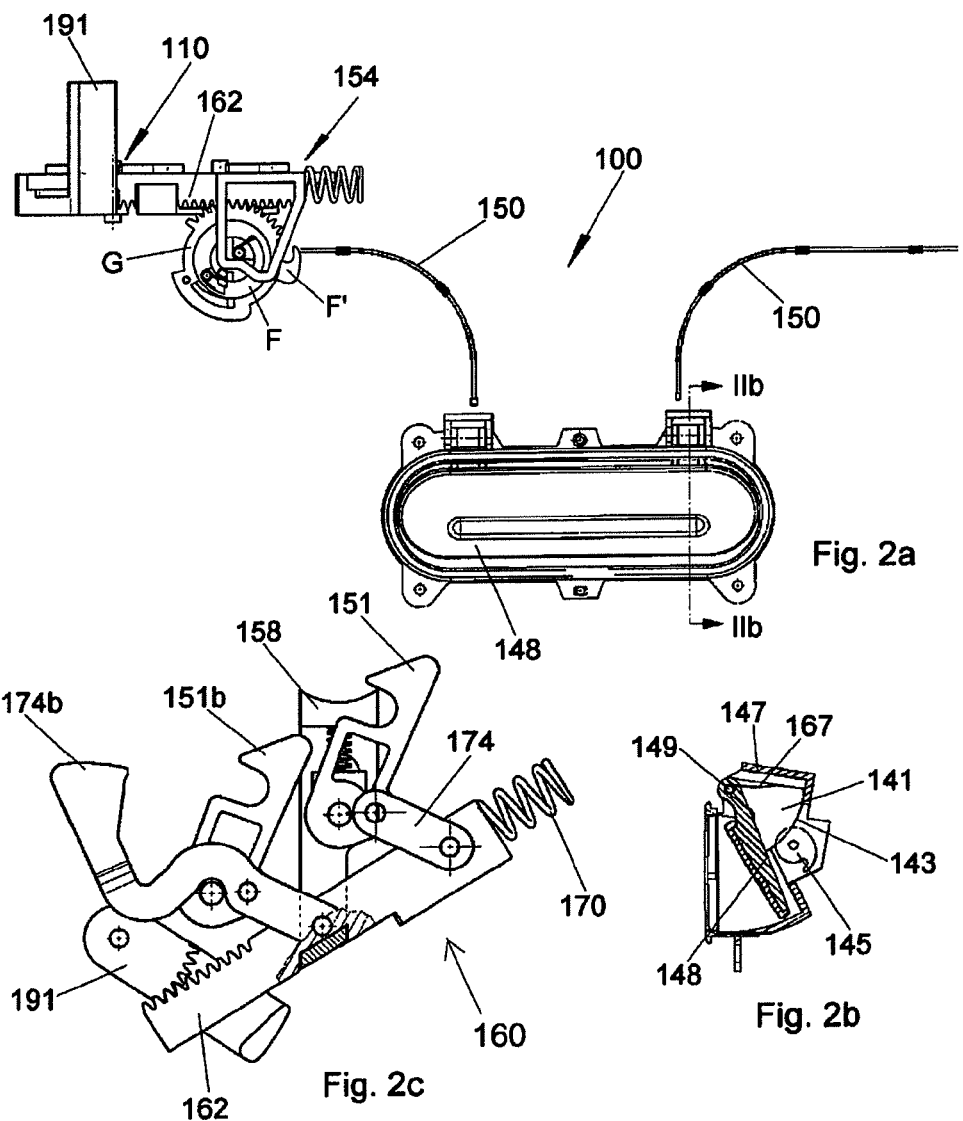

LOCKING MECHANISM FOR A HOUSING AND LOCK SUITABLE THEREFOR

BACKGROUND

The invention relates to a locking mechanism for a housing with a lid, particularly a luggage compartment, having at least two locks, each of which is connected via a transmission element to a push button.

The invention additionally relates to a lock for such a locking mechanism with a locking bolt device, carrying both locking bolts, with a catch having two locking hooks pivotal about a pivoting axis for catching the locking bolts in order to lock the lock, with among the housing and lid elements one of them carrying the locking bolt device and the other one receiving or carrying the catch, and with a manually operated drive device to pivot away the locking hooks from the locking bolts to unlock the lock, with the drive device being embodied for a jointly pivoting of the locking hooks.

The primary function of such a lock when used in an aircraft is to safely lock and unlock the lid or the luggage bin or container of a luggage box in all flight conditions, including emergency landing conditions. The drive device inside the lock is connected via a mechanical connection member to a push button or an operating handle, which is arranged at the lid such that it can be operated from outside the luggage box. The operation of the button or handle leads in the lock of prior art to a rotary motion of the mechanical connection member, by which the lock is unlocked. Here, the lock is embodied such that any unintentional opening in the loaded or unloaded state of the luggage box is avoided. In aeronautical engineering it is required that the catch of the lock comprises a fail-safe function. A dual locking serves for this purpose. This dual locking occurs in the lock of prior art, on the one hand, by a locking bolt which is engaged by a locking hook and, on the other hand, by a locking pin, which in the opened lid of the luggage box projects from the catch, however upon closing the lid of the luggage box being pushed into the housing of the catch by the locking bolt device. Both the locking bolt as well as the locking pin are each capable of compensating the load required.

In the locking mechanisms of prior art for a luggage box it is problematic that two locks must be operated from the push button or operating handle mounted centrally at the lid, which are arranged at one and/or the other end of the lid, with the operating handle and the two shafts as well as the two catches required to be mounted on one axis. The operating handle performs a rotary motion, which is transferred via the shafts to the catches of the locks. In the catches the rotary motion is respectively transformed into a pivotal motion of the locking hook. Entirely independent therefrom, the locking bolt of each lock is brought into its locking position, when the lid is closed. The locking bolt device presses the locking bolt passing said device into the housing of the catch. In cases in which the locks and the pivotal handle cannot be mounted on a single axis, the lock of prior art cannot be used at all. Further, it is problematic that the construction of the shafts necessary for operating the known lock and their fastening to the lid leads to additional weight, increased costs for parts, and an increased assembly expense, all of which being extremely undesirable in aeronautical engineering. Finally, in the lock of prior art, the locking bolt device can be adjusted in two axes. The locking bolt simultaneously serves as the contact for an end stop. This is disadvantageous in that for each adjustment of the locking bolt device, the contact for the end stop is moved and must be readjusted. Additionally, the opening of the lock occurs by pulling the operating handle. However, due to the fact that no transmission is provided between the operating handle and the shaft, higher operating forces are required.

The objective of an earlier German patent application of the same applicant yet unpublished at the time of the filing date is a lock for a luggage box, mounted overhead, for a cabin of an aircraft and an operating and locking mechanism for the lock. This lock avoids the above-mentioned disadvantages and can particularly be used for a luggage box, even when the operating button or handle is not located on the axis of the catches.

When in case of a malfunction the locking occurs only via one locking hook exhibiting play in reference to its allocated locking bolt, the lid projects slightly from the luggage box when it is closed so that the malfunction is easily detected from the outside.

A locking mechanism is known from DE 200 17 674 U1. In this known locking mechanism for a not completely closed position of the locks of a luggage box, it indicate that the actuation element is maintained in the actuated position until all the locks of the luggage box are locked completely, but not in connection an actuating element that is formed as a push-button.

A lock is also generally known from WO 2008/086256 A1.

SUMMARY

The objective of the invention is to provide an advantageous alternative for each of the above-mentioned locking mechanism and the above-mentioned lock.

This objective is attained according to the invention in a locking mechanism of the type mentioned at the outside such that a freewheel is provided between each lock and the push button, which in cooperation with the lock holds the push button in the pushed-in position until every lock allocated to the housing is in the correctly locked position, that that a stopper is allocated to one of the two locking hooks embodied and arranged such that for a completely opened lock, the drive device is locked in its position but during the locking process releases the drive device as soon as the locking hook assumes a position in reference to the locking bolt suitable for locking, and that each of the freewheels couples the transmission element connected to the push button to the lock in a form-fitting or force-fitting fashion when each of the locks is correctly locked, and in all other cases interrupts the form-fitting or force-fitting coupling of the lock to the transmission element.

Further, this objective is attained according to the invention in a lock of the type mentioned at the outset in that the drive device comprises a gear rack, which can be displaced by a manual operation against the pressure of a spring element and which is embodied in a recess to receive an end of the stopper, that the drive device can be operated by the transmission element and that a freewheel is allocated to the transmission element arranged between the drive device of the lock and the push button, which in the locked and unlocked lock couples the transmission element to the lock in a form-fitting or force-fitting fashion, but interrupts the form-fitting or force-fitting coupling of the lock to the transmission element during the locking process of the lock unless every one of the locks connected to the push button is also correctly locked.

The lock according to the invention, similar to the lock according to the previous suggestion of the applicant, can be unlocked by a traction cable, which extends invisibly inside the lid (luggage bin or compartment) or inside the container. The use of a light traction cable provides a weight advantage. The assembly is uncomplicated because traction cables can be assembled much easier than shafts and levers made from GFK. The lower weight and the lower assembly expense are complemented by lower costs for parts.

The primary advantage of the locking mechanism and the lock according to the invention comprises that the locking mechanism is embodied such that an incompletely latched catch can be visually recognized, for example based on the position of the push button used to unlock the lock. When the lid of a luggage box of an aircraft receiving the luggage, provided at its ends each with a lock of the type mentioned at the outset, is rotated such that only one of the catches latches completely this fact is visible from the outside because then the lid cannot close in a flush manner. Due to the fact that this status of an only unilaterally correctly latching lock is no longer permissible and prohibits the start of the aircraft the locking mechanism and the lock according to the invention prevent such a situation by the push button being held in the pushed-in position until the locks at both ends of the luggage box have completely latched.

The push button is held pushed down by the blocking mechanism in at least one of the locks of the container. The freewheel mechanism uncouples the two locks of the container connected by traction cables to the push button and this way allows a unilateral locking. The push button remains blocked until both locks have completely latched. This embodiment of the locking mechanism allows a separate control of the locks provided at the container. The push button shows by its held-down position that at least one lock is unlocked until all locks of the container are completely locked.

The underlying idea of the present invention is to provide a one-piece push button. When a luggage box is incompletely latched at one side the push button remains in the pushed-in position. This is achieved by a freewheel. The push button may only assume the not-pushed down position when both locks of the luggage box are locked. Only when both locks are locked the drive device assumes a position in which the push button can enter the not-pushed down position. When only one lock is locked the freewheel is acting such that the push button is only in the non-pushed down position when both locks are locked. The push button therefore provides a binary code. It provides by Yes/No or pushed down/not pushed down if both locks of a luggage box are completely locked/unlocked.

By the locking mechanism according to the invention the locking mechanism of each lock is provided with a stopper, which in the open state of the lock engages via transmission elements the connected parts and fixes these parts in their position. This is allowed in the locking mechanism and the lock according to the invention by the provision of a freewheel and stoppers, which cooperate with each other in order to hold the push button in the pushed-down position until each lock allocated to the housing or the luggage box reaches the correctly locked position.

Further, the locking mechanism according to the invention couples each freewheel with the transmission element connected to the push button with the lock in a form or force-fitting fashion when each lock is correctly locked. In all other cases, each freewheel can interrupt the form or force fitting coupling of the lock with the transmission element. This serves the purpose that, when e.g., two locks are allocated to a luggage box and the lid is closed such that only one lock is locked but the other lock remains open, the locking mechanism of the locked lock has the required freedom of motion, in spite of the transmission elements connected to the same push button not being able to perform any motion in case of a unilateral locking of a luggage box.

By the lock according to the invention, the drive device comprises a gear rack, which can be displaced by a manual operation against the pressure of a spring element, and in which a recess is formed to accept one end of the stopper.

Further, with the lock according to the invention the drive device can be operated by the transmission element.

Further, with the lock according to the invention a freewheel is allocated to the transmission element arranged between the drive device of the lock and the push button, which in case of locked and unlocked locks coupling the transmission element to the lock in a form or force fitting fashion, but interrupts the form or force-fitting coupling of the lock to the transmission element unless during the locking process of the lock every lock also connected to the push button is also correctly locked. The purpose is here, similar to the above explained embodiment, to allow the operation of the locking mechanism in an unilateral locking of a luggage box in spite of the fact that the allocated transmission elements connected to the same push button cannot move.

Advantageous embodiments of the invention are provided in the dependent claims.

In an embodiment of the lock according to the invention the locking hooks are connected to each gear rack by a knee lever, which is linked to the locking hook next to its pivot axis such that the locking position can only be opened by the application of a tension force upon the linking site of the knee lever at the locking hook and the stopper being further supported in a displaceable fashion on the pivot axis of the knee lever.

In another embodiment of the lock according to the invention, a pressure spring is allocated to the stopper so that the gear rack can be detachably locked in a spring-loaded fashion by the stopper in its open position.

Another embodiment of the lock according to the invention is its application in a housing or a luggage box, with its lid being movable about a rotary axis.

BRIEF DESCRIPTION OF THE DRAWINGS

In the following, exemplary embodiments of the invention are explained in greater detail with reference to the drawings. Shown are:

FIG. 1a a preferred embodiment of the locking mechanism according to the invention, which is connected via a traction cable and a freewheel to the lock according to the invention, FIG. 1b a push button of the locking mechanism according to FIG. 1a in a cross-section along the line Ib-Ib in FIG. 1a.

FIG. 1c a detail in a side view of the locking mechanism of the lock according to FIG. 1a, FIGS. 2a-2c the locking mechanism and the lock according to FIGS. 1a-1c, however with the push button being in the pushed-down position (FIG. 2b) and the locking mechanism of the lock being open (FIG. 2c), FIG. 3a-3d explanatory figures concerning the function of the freewheel, FIG. 4 a lock according to the invention in a side view with an open catch housing and in the locked state, FIG. 5 the lock according to the invention in a view similar to FIG. 4, but in the unlocked state, FIG. 6 the lock according to FIG. 5, but in a view from the rear, FIG. 7 the catch of the lock according to FIGS. 4-6 in an exploded illustration, FIG. 8 as a detail of a locking bolt device, with for reasons of clarity in FIGS. 4-6 only two locking bolts being shown, and FIG. 9 a schematic side view of a luggage box of an aircraft.

Before the locking mechanism, shown in FIGS. 1a-1c and 2a-2c in a preferred embodiment and marked in its entirety with 100 is described, first the lock according to the invention is described in detail with reference to FIGS. 4 through 9 to the extent it is equivalent to the earlier suggestion by the applicant mentioned at the outset. Subsequently with reference to FIGS. 1a-1c and 2a-2c within the scope of the description of the locking mechanism 100 the differences are described, which characterize the lock according to the invention in reference to the previous suggestion and which is shown in FIGS. 1a-1c and 2a-2c, marked 110 in its entirety.

DETAILED DESCRIPTION OF THE PREFERRED EMBODIMENTS

Figure 4:
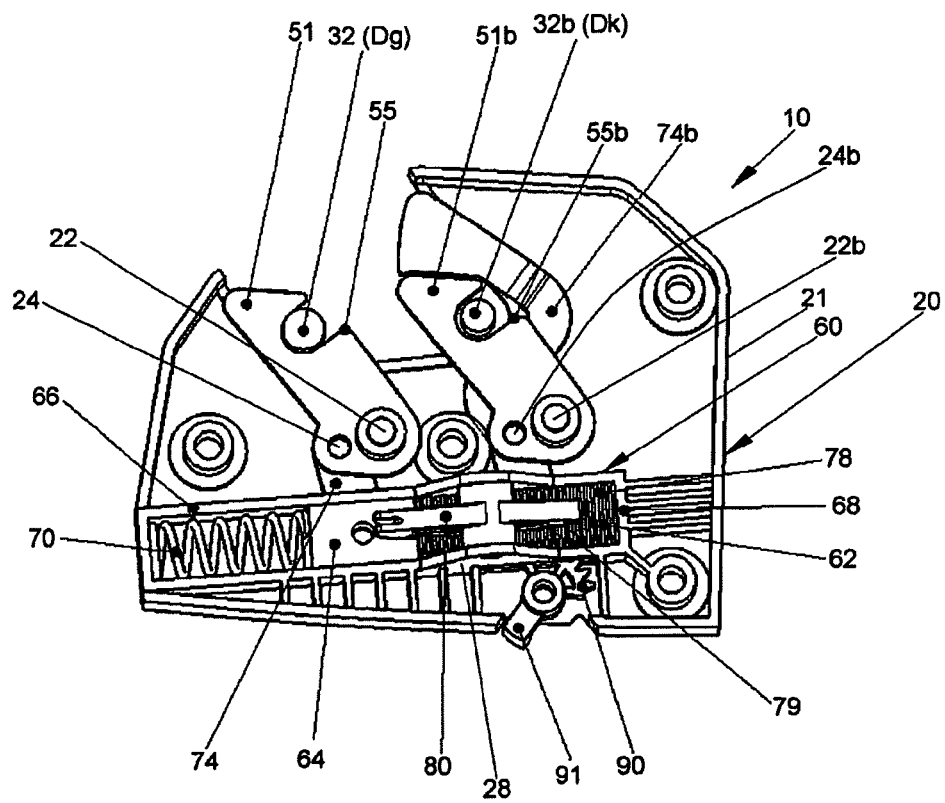
Figure 5:
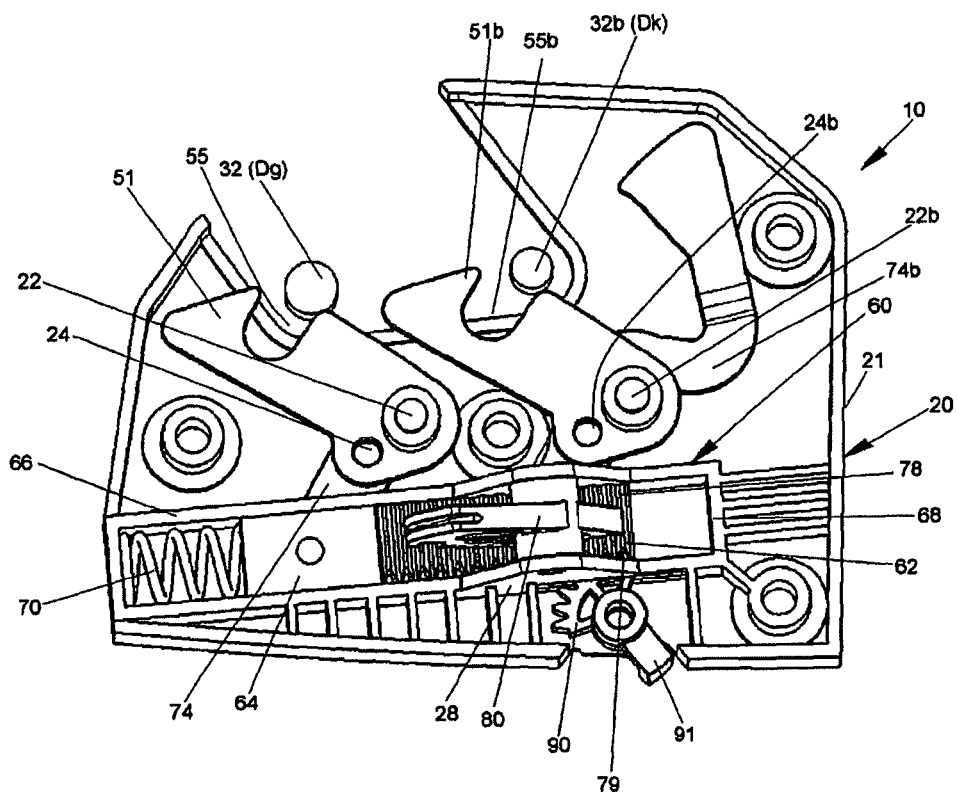
Figure 6:
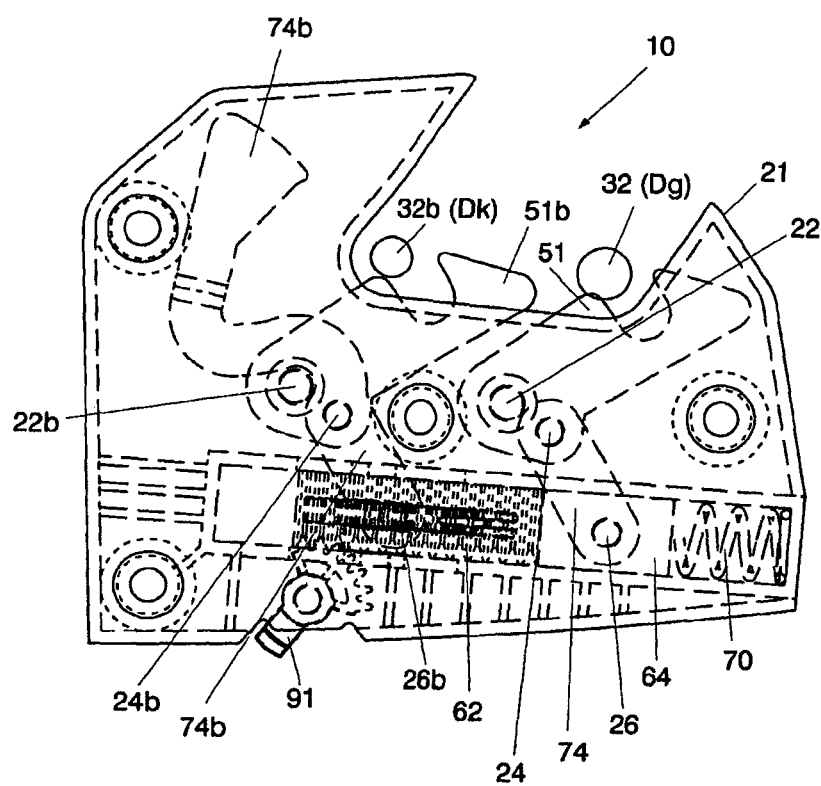

FIG. 4 shows an exemplary embodiment of a lock according to a previous suggestion of the applicant, which is marked 10 in its entirety. The lock 10 represents a catch lock. It comprises a catch marked 20 in its entirety and locking bolt devices (keeper) shown in FIG. 6 and marked 30 in their entirety, with only two locking bolts 32 and 32b being shown in FIG. 4. The lock 10 preferably serves for a luggage box 40 mounted overhead in the cabin of an aircraft, with an example being shown in FIG. 9 in a schematic side view.

Figure 9:
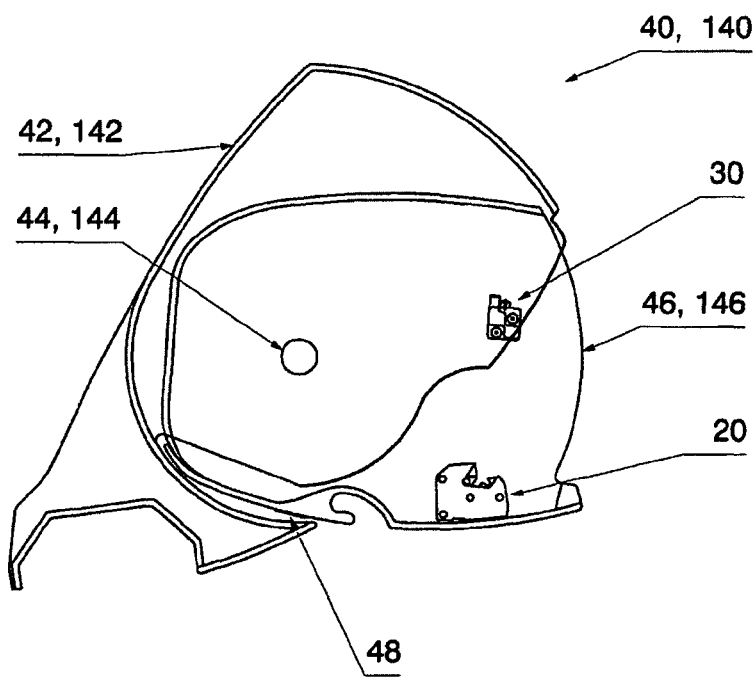

According to the illustration in FIG. 9 the luggage box 40 has a stationary housing 42, which is mounted overhead in the cabin of an aircraft. The housing 42 comprises a lid 46 that is articulate about a rotary axis 44. In the exemplary embodiment shown, the lid 46 comprises a luggage bin or container opening towards the bottom. The locking bolt device 30 of the lock 10 is mounted at a side wall of the housing 42. The catch of the lock 10 is arranged at a side wall of the lid 46 adjacent to the side wall of the housing, namely such that when pivoting the lid 46 upwards, the catch 20 and the locking bolt device 30 mutually engage. At an opposite end of the luggage box 40, not shown, another identically embodied lock 10 is provided. The operation of the lock 10 occurs by a push button 48, which is connected via traction cables 50, one of which being shown in FIG. 7, to the catch 20 of each lock 10. When the lid 46 is moved upwards, out of the position shown in FIG. 9 in which the lock 10 is unlocked, the catches 20 and the locking bolt 32, 32b of the locking bolt device 30 engage each other, thus locking the lock 10. By operating the push button 48 the lock is unlocked again, subsequently the lid 46 moves downwards under its own weight or loaded by luggage into the position shown in FIG. 9.

Figure 7:
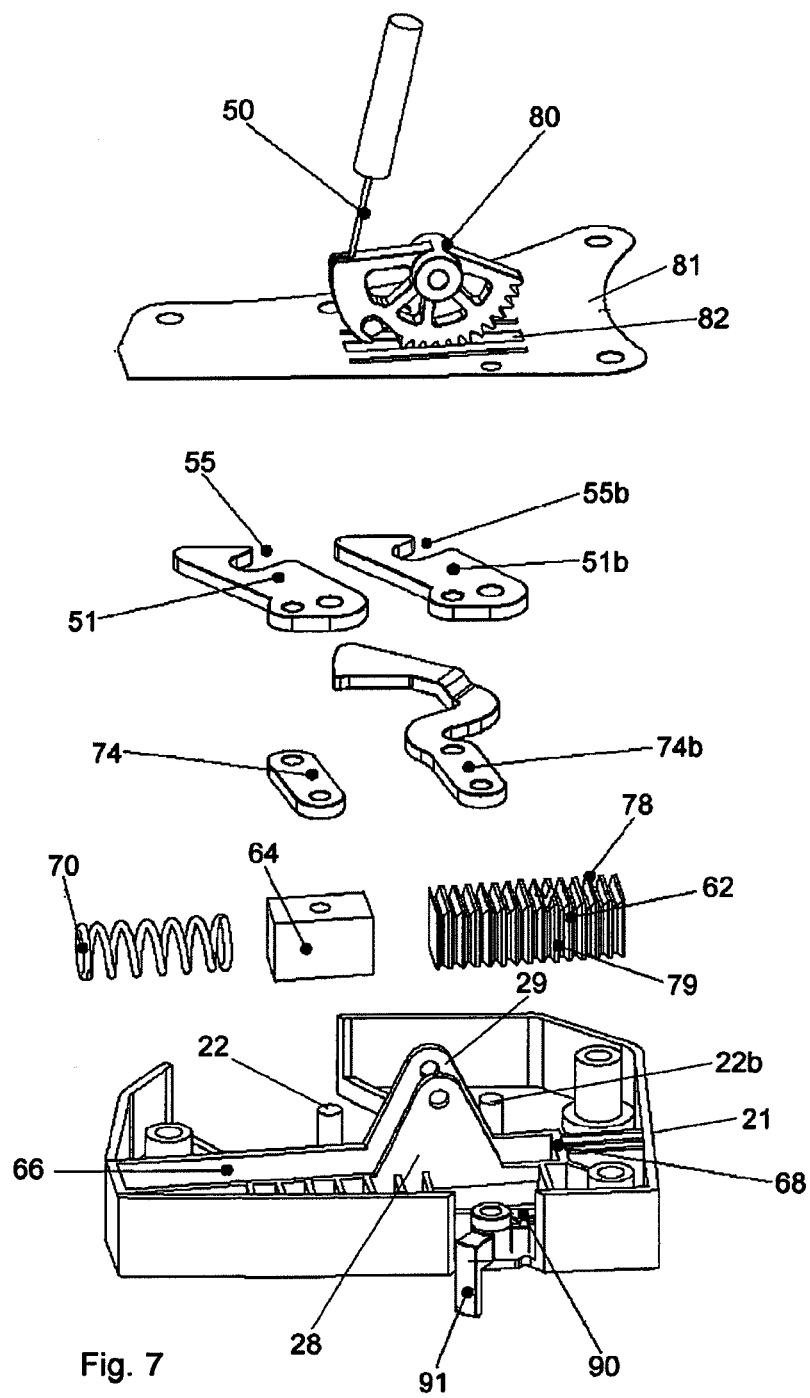
Figure 8:
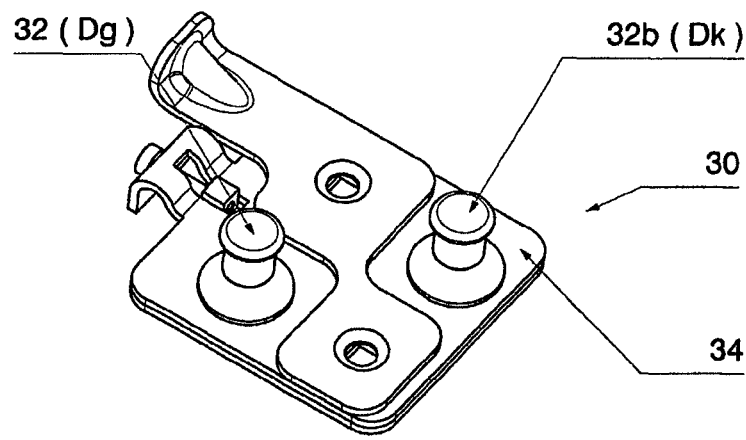

The catch 20 comprises a housing 21 made from fiberglass-reinforced thermoplastic, with its design best discernible from the exploded illustration of the catch 20 in FIG. 7. The catch 20 comprises two locking hooks 51, 51b, each pivotal about a pivot axis 22 and/or 22b. The locking hooks 51, 51b each have an opening 55 and/or 55b to engage the locking bolt 32, and/or 32b. The locking bolt 32, 32b are fastened parallel in reference to each other at a base plate 34 of the locking bolt device 30, as discernible from FIG. 8. The locking hooks 51, 51b can be pivoted from the position shown in FIG. 4, in which the lock 10 is locked, with the help of a drive device marked 60 in its entirety into the position shown in FIG. 5, in which the lock 10 is unlocked.

The drive device 60 comprises a gear rack 62 and a slider 64, arranged successively in a linear guide 66. The linear guide 66 is formed by a channel provided in a housing 21. The right end of the channel in FIG. 4 forms a stop 68 for the gear rack 62. The gear rack 62 and the slider 64 are pre-stressed by a spring element 70, also arranged in the channel, in the direction towards the stop 68, so that they are urged to assume the position shown in FIG. 4.

The locking hooks 51, 51b are connected to the gear rack 62 and/or to a slider 64 by a knee lever 74 and/or 74b. The knee levers 74, 74b are each linked to the locking hooks 51 and/or 51b, each next to their pivot axis 22 and/or 22b at another pivot axis 24 and/or 24b. The knee levers 74, 74b are discernible completely in the rear view of the lock 10 of FIG. 6. It is further discernible from FIG. 6 that the knee lever 74 is extended beyond its linking point 24 at the locking hook 51 and is embodied as a preliminary trigger lever to slide the gear rack 62. In the following, the function of the preliminary trigger lever is explained in greater detail.

The drive device 60 is completed by a sprocket 80, which engages with gears 78 the gear rack 62 and can be operated by one of the traction cables 50 connected to the push button 48. The sprocket 80 transfers the translational motion of the traction cable 50 into a translational motion of the gear rack 62 and the slider 64. In the exploded illustration in FIG. 7 additionally a lid 81 made from aluminum is allocated to the housing 21, not shown in FIGS. 4 and 5. It covers the linear guide 66 with the elements arranged therein towards the top and provides a counter-bearing to the axes 22/22b. The sprocket 80 projects through a central slot 82 into the lid 81 and engages the gears 78 of the gear rack 62. When a tensile force is enacted by the traction cable 50 upon the sprocket 80 it rotates in FIG. 7 in the clockwise direction and moves, in the illustration in FIG. 4 against the pressure of the spring element 70, the gear rack 62 and the slider 74 towards the left in the direction away from the stop 68. The knee levers 74, 74b are each linked at their end adjacent to the pivot axis 24 and/or 24b at the side facing away from the sprocket 80 at a pivot axis 26 and/or 26b at the slider 64 and/or at the gear rack 68, as best discernible from the rear view of the lock 10 in FIG. 6. Here, the arrangement is made such that the knee levers 74, 74b in the position shown in FIG. 4, in which the lock 10 is locked, can only be unlocked by the effect of a tensile force upon the link of the knee lever 74, 74b at the locking hook 51 and/or 51b. The reason is here that in this position the knee levers 74, 74b are each together with their allocated locking hook 51 and/or 51b in a so-called positive locking or over-center position, from which they cannot be removed from the openings 55, 55b of the locking hook 51 and/or 51b by the impact of a force. This positive locking can only be released by a displacement of the gear rack 62 and the slider 64, i.e. by a rotation of the sprocket 80 or by activating an emergency operating lever 91 described in greater detail in the following. During such displacement, at least the locking hook 51b is pivoted in the counter-clockwise direction into the position shown in FIG. 5, in which the lock 10 is unlocked.

Due to the above-mentioned positive locking, the locking hooks 51, 51b, in their locked position shown in FIG. 4, are also locked mechanically in order to prevent any opening due to overload or extreme vibrations. This is achieved by the knee levers 74, 74b here moved beyond their dead center and this way being locked or blocked in their end position. The locking hooks 51, 51b can also be blocked by latches or ratchets, however the embodiment shown is simpler in its design and mechanical solution, because latches or ratchets would lead to additional components, which are harder to operate under load.

The sprocket 80 is supported rotational above the gear rack 62 at the housing 21. For this purpose, at both sides of the guide 66 two consoles 28, 29 extend upwards, each of which comprising a bearing hole, in which an axle of the sprocket 80 is supported in a rotary fashion.

As best discernible in FIG. 7, the gear rack 62 comprises an additional gear 79, which engages the gear 90 at the above-mentioned emergency operating lever 91, which is pivotally supported at the housing 21.

The two locking hooks 51, 51b are embodied identically. However, the locking bolts 32, 32b show differently large diameters Dg and/or Dk. Thus, the locking bolt 32b shows play in the opening 55b in the locking hook 51b, when the locking hook 51, 51b is in the position shown in FIG. 4, in which the lock 10 is locked.

Normally, the spring element 70 presses the gear rack 62 by the slider 64 against the stop 68, so that the lock 10 is always locked when no pressure is applied upon the push button 48. When the spring element 70 is unable to do so due to a malfunction, for example a broken spring, the locking hook 51b is allocated to the knee lever 74b embodied as a preliminary trigger lever for the purpose of locking the lock with the help of the emergency operating lever 91 can manually engage the locking bolt 32b with the smaller diameter Dk, even when the other locking bolt 32 does not or cannot engage the other locking hook 51. As soon as the emergency operating lever 91 has brought the locking hook 51b into the position shown in FIG. 4, the knee lever 74b assumes its positive locking position, from which it can only be removed by a renewed operation of the emergency operating lever 91, so that the lock 10 remains in the locked position even after a manual emergency locking process. The emergency operating lever 91 can be operated via a small gap existing between the lateral wall of the lid 46 and the lateral wall of the housing 42 via an object, such as a credit card or the like.

Normally, when no malfunction is given at the spring element 70 or any other point which might hinder or prevent the proper operation of the lock, the lock is in the position shown in FIG. 4 when the lid 46 of the luggage box 40 is closed. By pulling the traction cable 50 due to an operation of the push button 48, the sprocket 80 is rotated, in the illustration according to FIGS. 4 and 5 in the clockwise direction. This way, the gear rack 62 and with it the slider 64 is moved against the pressure of the spring element 70 to the left, so that the locking hook 51, 51b is pivoted in the counter-clockwise direction into the position shown in FIG. 5, in which the lock 10 is unlocked. As soon as the locking bolts 32, 32b are released from the openings 55, 55b of the locking hooks 32, 32b the lid 46 moves downwards so that the luggage can be removed from the luggage box 40 or can be inserted into the luggage box. When now the lid 46 is once more snapped upwards, the upper, free left end of the preliminary trigger lever shown in FIG. 4 and embodied as a knee lever 74b is pivoted against the locking bolt 32b and is pivoted thereby in the clockwise direction, thus moved into the housing 21. Due to the fact that the locking bolt 32b impinges the free end of the knee lever 24b, first the positive locking is released via the preliminary trigger lever. The locking hooks 51, 51b can be moved again in order to allow the lock 10 to latch. It is discernible in FIG. 6 that the knee lever 74b here moves the gear rack 62 and the slider 64 in the direction away from the stop 68, with here the spring element 70 being stressed. The locking bolts 32, 32b here move past the locking hooks 51, 51b until they reach the openings 55, 55b. As soon as they are located above the openings 55, 55b, the locking hooks 51, 51b are pivoted by the pressure of the spring element 70 into the position shown in FIG. 4, in which the lock 10 is locked again. The emergency operating lever 91 here follows the motion of the gear rack 62.

The catch 20 is double locked by the locking of the lock 10 at the locking bolt arrangement 30, namely a primary locking occurs between the locking hook 51 and the locking bolt 32 with the help of the knee lever 74 and a secondary locking between the locking hook 51b and the locking bolt 32b with the help of the knee lever 74b. Neither the primary locking nor the secondary locking can be released by the impact of force upon the locking hook 51, 51b, because the knee levers 74, 74b are each in a positive locking in the locking position, as explained above.

When the primary locking is blocked in the open position because a malfunction is given at the lock 10, this lock 10 can still be locked in the locked position with the help of the secondary locking by the knee lever 74b. When in case of a malfunction the locking occurs only via the locking hook 51b and the locking bolt 32b, due to the play between the locking hook 51b and the locking bolt 32b the lid slightly projects from the luggage box 40 in the closed state so that a malfunction is easily discernible from the outside. Due to the fact that the lid 46 is safely locked in spite thereof, the aircraft may take off.

With reference to FIGS. 1a-1c and 2a-2c the locking mechanisms according to the invention and a lock according to the invention are now described in greater detail for such a locking mechanism. Here, the description is limited to an expansion of the function, which applies to the locking mechanism and the lock, by a modified gear rack, an additional stopper, and an additional freewheel. The freewheel is additionally explained with reference to FIGS. 3a-3d. Compared to the previous suggestion of the applicant, the components are marked with reference characters increased by 100. The freewheel not provided in the earlier suggestion of the applicant comprises components marked with letters. The design of the locking mechanism and the lock according to the invention are only described to the extent they differ from the design of the locking mechanism and the lock according to the earlier suggestion of the applicant.

According to the illustration shown in FIGS. 1a and 1b as well as 2a and 2b the locking mechanism 100 comprises a push button 148, which is connected via a transmission element, which in the exemplary embodiment shown are represented as traction cables 150, to one of at least two locks 110 of a luggage box 40. The push button 148 is supported in a push button housing 147 pivotal about a pivot axis 149. The push button 148 is provided with a spring 167. The spring 167 is arranged pivotal about the pivot axis 149 and has two arms supported at the inside of a push button housing 147 and/or at the inside of the push button 148 and urged to rotate the push button 148 about the pivot axis 91 in the clockwise direction.

FIG. 1b shows the push button 102 in its resting position and FIG. 2 in its operated position.

According to the illustration in FIGS. 1a and 2a the push button 148 of the locking mechanism 100 is mechanically coupled via the traction cable 150 and the freewheel 154 to the gear rack 162 of the lock 110. The design is embodied such that the gear rack 162 of the lock 110 simultaneously represents a part of the freewheel 154. The lock 110 is shown in FIGS. 1a and 1c in the locked condition and in FIGS. 2a and 2c in the unlocked condition. In the unlocked state the push button 148 is in the pushed-in position, which is shown in FIG. 2b, and which is maintained by the freewheel 154 until the lock 110 is locked. As soon as the lock 110 is locked, as shown in FIGS. 1a and 1c, the push button 148 assumes the position shown in FIG. 1b. This position is assumed by the push button 148 only when both locks 110 connected to the very same push button 148 engage both of the locking hooks 151, 151b with their corresponding locking bolts 132 and 132b, respectively.

In the embodiment of the invention shown here, the freewheel 154 is integrated in the gear rack 162 of the lock 110.

This way the freewheel is directly connected to the lock. However, this is not mandatory. The freewheel 154 could also be arranged distanced from the lock and connected to said lock via a traction cable.

Before the locking mechanism 100 is described any further, first the design of the lock 110 is discussed in greater detail.

Compared to the earlier suggestion of the applicant, the gear rack 162 is provided with a greater length in reference to the gear rack 62. Additionally, the emergency operating lever 191 has been arranged off-set in reference to the emergency operating lever 91 in order to increase the length of its lever. A stopper 158 is allocated to the locking hook 151, embodied and arranged such that it fixes the gear rack 162 in its position when the lock 110 is completely open, as shown in FIG. 2, however releases the gear rack 162 of the drive device 160 during the locking process as soon as the locking hooks 151, 151b assume suitable positions for locking in reference to the locking bolts 132, 132b. The gear rack 162 of the drive device 160 can be displaced by a manual operation against the pressure of the spring element 170. A recess 192 is formed in the gear rack 162 to receive the end of the stopper 158. The position, in which one end of the stopper 158 is received in the recess 192 of the gear rack 162 is shown in FIG. 2c.

By pressing the push button 148, similar to the earlier suggestion of the applicant, the gear rack 162 is displaced and the locking hooks 151, 151b are opened. The position of the push button 148 is controlled by the gear rack 162. Its pushed-in position (FIG. 2b) indicates that at least one of the two locks 110 of the luggage box is not locked. As soon as the locking hooks 151, 151b of the lock 110 according to the invention are completely unlocked and move away from the locking bolts 132, 132b, the stopper 158 locks the gear rack 162 in its open position via a spring 194, indicated in FIG. 1c. During the locking process the locking bolt 132 contacts the stopper 158 and releases the gear rack 162 only when the locking hooks 151, 151b are located in the correct position in reference to the locking bolts 132, 132b. The locking hooks 151, 151b of the lock 110 then can latch at the locking bolts 132, 132b.

At the back of the push button 148, a sector part 141 is mounted, which comprises at its arc-shaped exterior perimeter an involute gear 143, which engages the gear of a rotary operating element 145, with a traction cable 150 being engaged at its exterior perimeter as discernible from the cross-sections of the push button 148 in FIGS. 1b and 2b.

The freewheel 154 has a drive wheel F, which is driven by the traction cable 150, engaged at a hook F' of the drive wheel F. A connection is established between the drive wheel F and an actuator J via the slide H. The actuator J is pivotally supported in the sprocket G and is held in its position by a leg spring A. The slide H is pressed via a leg spring B in the direction of a primary axis L. The drive wheel F is pushed via a leg spring C into the initial position. By operating the drive wheel F with the traction cable 150, the gear rack 162 is driven via the sprocket G and the lock 110 is opened. In the open position (the stopper 158 locks the gear rack 162) the slide H latches the drive wheel F to the primary axis L. The push button 148 is held pushed-down by the blocking mechanism (gear rack 162, stopper 158). The push button 148 remains blocked in its pushed-down position until both locks 20 are completely latched. During the locking process the stopper 158 releases the gear rack 162. The sprocket G can turn back into the initial position without entraining the drive wheel F, when not all of the locks coupled to the push button are correctly locked. By the movement of a cam K, located at the gear rack 162, over the slider H said slider unlocks and the drive wheel F can once more turn back into its initial position.

This design of the locking mechanism 100 allows a separate addressing of both locks 110 of a luggage box. The push button 148 indicates an open system until both locks 110 are locked in the correct position. In the following, this shall be discussed in greater detail with reference to the explanatory FIGS. 3a-3d.

Figure 3A:
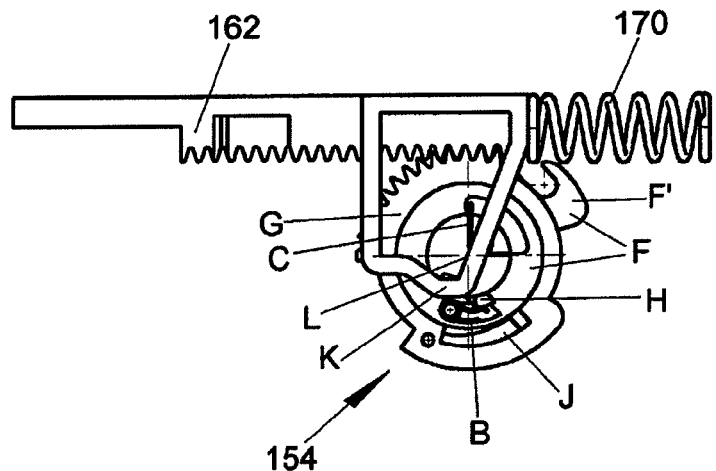

It is assumed that the luggage box comprises two locks 110 and that a freewheel 154 is allocated to each lock 110. FIG. 3a shows the freewheel 154 in the state when both locks are completely locked. The drive wheel F of the freewheel 154 is shown in its initial position.

Figure 3B:
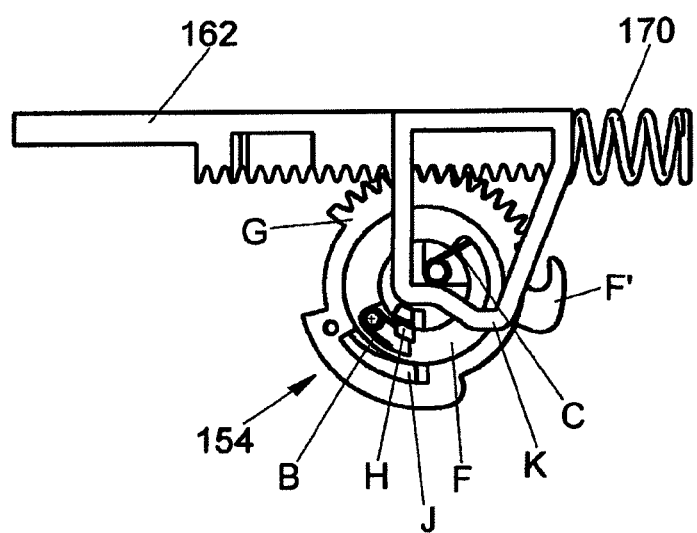

FIG. 3b shows the freewheel 154 in the case when both locks are unlocked. By pulling the hook F' it has been moved in the three o'clock position shown.

Figure 3C:
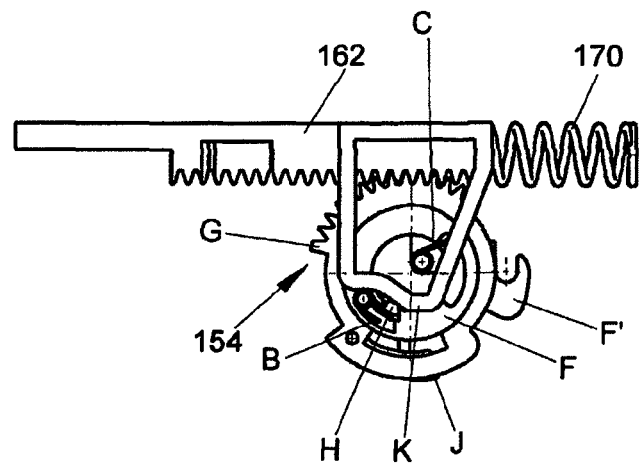

FIG. 3c shows a phase of the motion of the gear rack 162 during a locking process. The drive of the gear rack 162 occurs by the system spring 170. Compared to the position according to FIG. 3b the gear rack has moved to the left. The hook F' and thus the drive wheel F has maintained its position, because the drive wheel F has been uncoupled from the sprocket G by the cam K, which has run up the slide H.

Figure 3D:
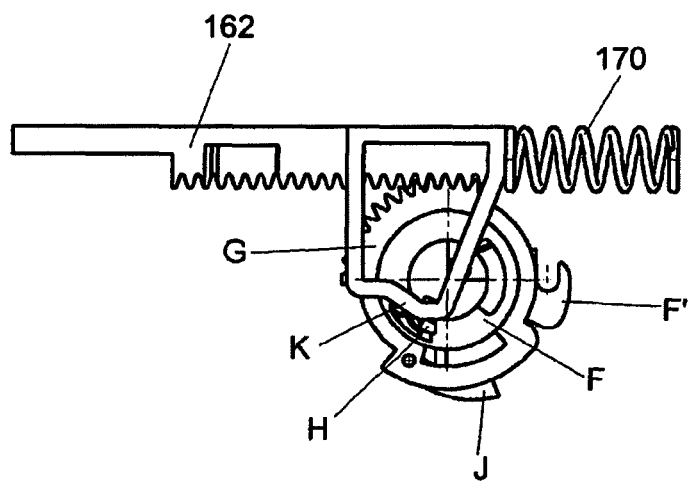

FIG. 3d shows the condition of the freewheel 154, when one lock of a luggage box is completely locked and the other lock is open. Both traction cables 154 have brought their allocated drive wheels F into the position shown. In one of the locks, which has been correctly locked, the gear rack has moved to the left into the position shown in FIG. 3d, though, thus decoupling the sprocket G from the drive wheel F, as explained above with reference to FIG. 3c. When the second lock is also completely locked both traction cables are released so that in both freewheels 154 the drive wheel F can move into the position according to FIG. 3a. Due to the fact that both traction cables following the motion of the hook F' into the position according to FIG. 3a the push button 148 can leave the pushed-down position according to FIG. 2b and return into the original position according to FIG. 1b, each time driven by the spring 167 of the push button 148.

The freewheel 154 interrupts the form-fitting or force-fitting connection between the drive wheel F and the sprocket G unless both of the locks of a luggage box are correctly locked. It is notable that the sprocket G in the open position of the lock is not connected with the drive wheel F. Otherwise, the freewheel 154 is ineffective, i.e. the form-fitting or force-fitting connection (here only the form-fitting connection is shown) are maintained. Thus, in an aircraft cabin the luggage box remains locked even when the passenger has locked it only at one side. The cabin personnel has the option, though, to detect by the position of the push button that the locking is not correct because in spite of the closed luggage box the push button remains in its pushed-down position. When the cabin personal then also locks the second lock (e.g. by a forceful pressure against the respective end of the lid of the luggage box) the push button is unlocked from its pushed-down position, as explained above, and can return into its not pushed down position according to FIG. 1b so that it is then ready for the next unlocking process.

LIST OF REFERENCE CHARACTERS 10, 110 Lock
20 Catch
21, 121 Housing
22 Pivot axis
22b, 122b Pivot axis
24 Pivot axis 24b Pivot axis
26 Pivot axis
26b Pivot axis
28 Console
29 Console
30 Locking bolt device
32, 132 Locking bolt
32b, 132b Locking bolt
34 Base plate
40, 140 Luggage box
42, 142 Housing
44, 144 Rotary axis
46, 146 Lid
48 Push button
50, 150 Traction cable (transmission element)
51, 151 Locking hook
51b, 151b Locking hook
55 Opening
55b Opening
60, 160 Drive device
62, 162 Gear rack
64 Slider
66 Linear guide
68 Stop
70, 170 Spring element
74, 174 Knee lever
74b, 174b Knee lever
78 Gears
79 Gears
80 Sprocket
81 Lid
82 Slot
90 Gears
91, 191 Emergency operating lever
100 Locking mechanism
141 Sector part
142 Housing
143 Involute gear
145 Operating element
147 Push button housing
148 Push button
149 Pivot axis
154 Freewheel
158 Stopper
167 Spring
192 Recess
194 Pressure spring
Dg large diameter
Dk small diameter
A Leg spring
B Leg spring
C Leg spring
F Drive wheel
F' Hook
G Sprocket
H Slide
J Agitator
K Cam
L Primary axis

The invention claimed is:

1. A locking mechanism for a housing with a lid, comprising:
first and second locks, each of which is allocated to a lock housing and is connected via a transmission element to a single push button;
a freewheel arranged between each of the first and second locks and the push button which in cooperation with the first and second locks holds the push button in a pushed-down position until each of the first and second locks is in a correctly locked position;
wherein each of the first and second locks includes pivotable locking hooks and a stopper allocated to one of the locking hooks;
wherein a manually operated drive device is allocated to each of the first and second locks, the manually operated drive device pivoting at least one of the locking hooks, wherein the manually operated drive device is locked in position when one of the locking hooks is in an unlocked position, and wherein the manually operated drive device is released when one of the locking hooks is in a locked position;
and wherein each of the freewheels couples the transmission element to a respective one of the first and second locks in a form-fitting or force-fitting fashion when each of the first and second locks is in the locked position, and interrupts the form-fitting or force-fitting coupling of said respective one of the first and second locks to the transmission element when each of the first and second locks is not in the locked position.

2. A locking mechanism according to claim 1, further comprising:
two locking bolt devices, each including locking bolts which engage the locking hooks of a respective one of the first and second locks in the locked position, wherein the locking bolt devices are attached to one of the elements of the housing or the lid and the lock housings of the first and second locks are attached to the other one of the elements of the housing or the lid;
and wherein each manually operated drive device is configured for a joint pivoting of the locking hooks of a respective one of the first and second locks and comprises a gear rack which is displaceable by a manual operation against pressure from a spring element, wherein the gear rack has a recess to receive an end of the stopper;
and wherein, for each of the first and second locks, the manually operated drive device is operable by the transmission element and the freewheel is allocated to the transmission element arranged between the manually operated drive device and the push button.

3. A locking mechanism according to claim 2, wherein the locking hooks are each connected to the gear rack via a knee lever, wherein each knee lever is attached to the locking hook adjacent to a pivot axis of the locking hook such that the locked position of the locking hooks can only be opened by the effect of a tensile force upon a link of the knee lever at the locking hook and wherein the stopper is supported on a pivot axis of the knee lever in a displaceable fashion.

4. A locking mechanism according to claim 3, wherein a pressure spring is allocated to the stopper such that the gear rack can be detachably locked in an open position in a spring-loaded fashion by the stopper.

5. A locking mechanism according to claim 4, wherein the housing is for a luggage box, with the lid being articulate about a rotary axis.

* * * * *